US008665271B2

(12) United States Patent
Nutter et al.

(10) Patent No.: US 8,665,271 B2
(45) Date of Patent: *Mar. 4, 2014

(54) SYSTEM AND METHOD FOR ITERATIVE INTERACTIVE RAY TRACING IN A MULTIPROCESSOR ENVIRONMENT

(75) Inventors: Mark Richard Nutter, Austin, TX (US); Gordon C. Fossum, Ausin, TX (US); Joaquin Madruga, Round Rock, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,941

(22) Filed: Apr. 27, 2012

(65) Prior Publication Data

US 2012/0213430 A1 Aug. 23, 2012

Related U.S. Application Data

(63) Continuation of application No. 12/188,290, filed on Aug. 8, 2008, now Pat. No. 8,525,826.

(51) Int. Cl.
*G06T 15/50* (2011.01)

(52) U.S. Cl.
USPC ........... 345/426; 345/419; 345/421; 345/427; 345/582; 345/619

(58) Field of Classification Search
USPC .................. 345/421, 426, 427, 419, 581, 619
See application file for complete search history.

(56) References Cited

U.S. PATENT DOCUMENTS

| 5,933,146 | A * | 8/1999 | Wrigley ..................... 345/420 |
| 6,597,359 | B1 * | 7/2003 | Lathrop ..................... 345/440 |
| 7,012,604 | B1 * | 3/2006 | Christie et al. ............... 345/426 |
| 2003/0234789 | A1 * | 12/2003 | Gritz ........................... 345/474 |
| 2004/0001062 | A1 * | 1/2004 | Pharr .......................... 345/426 |
| 2005/0231508 | A1 * | 10/2005 | Christensen et al. ........ 345/428 |
| 2005/0285852 | A1 | 12/2005 | Fossum et al. |
| 2006/0066607 | A1 * | 3/2006 | Schmittler et al. .......... 345/419 |
| 2006/0290696 | A1 | 12/2006 | Munshi et al. |

(Continued)

OTHER PUBLICATIONS

Christen, Martin, "Ray Tracing on GPU", University of Applied Sciences Basel (FHBB) Diploma Thesis, Jan. 19, 2005, 44 pages, retrieved from: http://www.cse.chalmers.se/~uffe/xjobb/Readings/GPURayTracing/Ray%20Tracing%20on%20GPU.pdf.*

(Continued)

*Primary Examiner* — Kimbinh T Nguyen
(74) *Attorney, Agent, or Firm* — James L. Baudino; Matthew B. Talpis

(57) ABSTRACT

A method comprises receiving scene model data including a scene geometry model and a plurality of pixel data describing objects arranged in a scene. The method generates a primary ray based on a selected first pixel data. In the event the primary ray intersects an object in the scene, the method determines primary hit color data and generates a plurality of secondary rays. The method groups the secondary packets and arranges the packets in a queue based on the octant of each direction vector in the secondary ray packet. The method generates secondary color data based on the secondary ray packets in the queue and generates a pixel color based on the primary hit color data, and the secondary color data. The method generates an image based on the pixel color for the pixel data.

16 Claims, 11 Drawing Sheets

(56) References Cited

U.S. PATENT DOCUMENTS

| | | | |
|---|---|---|---|
| 2007/0024615 A1 | 2/2007 | Keller et al. | |
| 2007/0035544 A1 | 2/2007 | Fossum et al. | |
| 2007/0043746 A1 | 2/2007 | Aguilar, Jr. et al. | |
| 2007/0057968 A1 | 3/2007 | Fossum et al. | |
| 2007/0182732 A1* | 8/2007 | Woop et al. | 345/420 |
| 2008/0043018 A1* | 2/2008 | Keller et al. | 345/426 |

OTHER PUBLICATIONS

Wald, I., Slusallek, P., Benthin, C., and Wagner, M., 2001, "Interactive Rendering with Coherent Ray Tracing" Computer Graphics Forum (Proceedings of Eurographics 2001), vol. 20(3), pp. 153-164.*

Christensen, P. H., Laur, D. M., Fong, J., Wooten, W. L., and Batali, D., 2003., "Ray Differentials and Multiresolution Geometry Caching for Distribution Ray Tracing in Complex Scenes." Computer Graphics Forum (Eurographics 2003 Conference Proceedings), pp. 543-552.., Blackwell Publishers.*

Zhou, T., Chen, J., and Pullen, M.; 2007, "Accurate depth of field simulation in real time", Computer Graphics Forum, vol. 26, 1, pp. 15-23.*

Boulos, S., Edwards, D., Lacewell, J. D., Kniss, J., Kautz, J., Shirley, P., and Wald, I., Jun. 1, 2006, "Interactive Distribution Ray Tracing", Technical report UUSCI-2006-022, SCI Institute, University of Utah, 13 pages.*

Erik Mansson, Jacob Munkberg, and Tomas Akenine-Moller, Sep. 10-Sep. 12, 2007, "Deep Coherent Ray Tracing", Proceedings of the 2007 IEEE Symposium on Interactive Ray Tracing (RT '07), IEEE Computer Society, Washington, DC, USA, pp. 79-85.*

Navratil, Paul Arthur, et al., Dynamic Ray Scheduling for Improved System Performance, Apr. 12, 2007, University of Texas at Austin, Department of Computer Sciences, Technology Report TR-07-19, Austin, Texas, US.*

Alexander Reshetov, Alexei Soupikov, and Jim Hurley. 2005. Multi-level ray tracing algorithm. In ACM SIGGRAPH 2005 Papers (SIGGRAPH '05), Markus Gross (Ed.). ACM, New York, NY, USA, 1176-1185.*

Jorg Schmittler, Ingo Wald, and Philipp Slusallek. 2002. SaarCOR: a hardware architecture for ray tracing. In Proceedings of the ACM SIGGRAPH/EUROGRAPHICS conference on Graphics hardware (HWWS '02). Eurographics Association, Aire-la-Ville, Switzerland, Switzerland, 27-36.*

Mansson, Erik et al., Deep Coherent Ray Tracing, Sep. 2007, IEEE/EG Symposium on Interactive Ray Tracing 2007, Ulm, Germany.

Jacopo Pantaleoni, "Production Rendering", Chapter 7 Global Illumination, Copyright 2005, Publisher Springer London, pp. 179-230.

Mark R. Nutter et al.; U.S. Appl. No. 12/188,290; Filing Date of Aug. 8, 2008; Office Action issued Jan. 17, 2013.

* cited by examiner

FIG. 3

```
color IterativeRayTrace (scene, ray)

blend = 1.0;
    C_Final = 0;

raytrace_loop:

hit = Intersect(scene, ray);

if !hit {
        C_hit = Background (ray);
    } else {
        blend *= SecondRayGen (ray);
        C_hit = Shade (ray);
    }

C_Final += C_hit * blend;

if !SecondaryComplete() {
        ray = SecondaryRay (&blend);
        goto raytrace_loop;
    } return C_Final
```

```
color RayTrace (scene, ray)

hit = Intersect (scene, ray);

if !hit
        return Background (ray);

C_hit = Shade (ray, hit);

if Transparent (hit) {
        opacity = Opacity (ray, hit);
        C_T = RayTrace(scene, Reflect (ray, hit));
        C_hit = C_hit * opacity + (1.0 – opacity) * C_T;
    } if Reflective (hit) {
        fresnel = Fresnel (ray, hit);
        C_R = RayTrace (scene, Reflect (ray, hit));
        C_hit = C_hit * (1.0 – fresnel) + C_R * fresnel;
    } return C_hit
```

200

PRIOR ART

FIG. 5

| Index | X | Y | Z |
|-------|---|---|---|
| 0 | + | + | + |
| 1 | + | + | - |
| 2 | + | - | + |
| 3 | + | - | - |
| 4 | - | + | + |
| 5 | - | + | - |
| 6 | - | - | + |
| 7 | - | - | - |

```
PacketRayTrace (scene, packet, colorAccum)

foreach ray in packet {
        blend[i] = 1.0;
        bounces[i] = 0;
        colorAccum[i] = 0;
    } raytrace_loop:

Intersect (scene, packet);

if AllMissed (packet) {
        Background (packet, blend, colorAccum);
        goto continue_raytrace;
    }

SecondaryRayGen (packet, blend, bounces);

Shade (packet, blend, colorAccum);

continue_raytrace:

if !SecondaryComplete() {
        packet = SecondaryPacket (blend, bounces);
        goto raytrace_loop;
    }
```

| o.x | o.y | o.z | {bc | idx} |
|---|---|---|---|
| d.x | d.y | d.z | blend |

```
uint4 HashDir (rd)
  x_lt_0 = CMPLT (rd.x, 0);
  y_lt_0 = CMPLT (rd.y, 0);
  z_lt_0 = CMPLT (rd.z, 0);

xhash = SEL (0, 4, x_lt_0);
  yhash = SEL (0, 2, y_lt_0);
  zhash = SEL (0, 1, z_lt_0);

return OR (xhash , OR(yhash, zhash));
```

600

| Index | Octant | Next Index | Next Octant |
|---|---|---|---|
| 0 | + + + | 4 | - + + |
| 1 | + + - | 0 | + + + |
| 2 | + - + | 1 | + + - |
| 3 | + - - | 2 | + - + |
| 4 | - + + | 5 | - + - |
| 5 | - + - | 6 | - - + |
| 6 | - - + | 7 | - - - |
| 7 | - - - | 3 | + - - |

FIG. 9

```
raytrace_loop:

Intersect (scene, packet);

if AllMissed (packet) {
        Background (packet, blend, colorAccum);
        goto continue_raytrace;
    }

AmbientRayGen (packet);

while !AmbientComplete() {
        amb_packet = NewAmbPacket (coverage);
        Intersect (amb_packet, scene);
        ProcessAmbient (amb_packet, coverage);
    }

SecondaryRayGen (packet, blend, bounces);

Shade (packet, coverage, blend, colorAccum);
```

FIG. 12

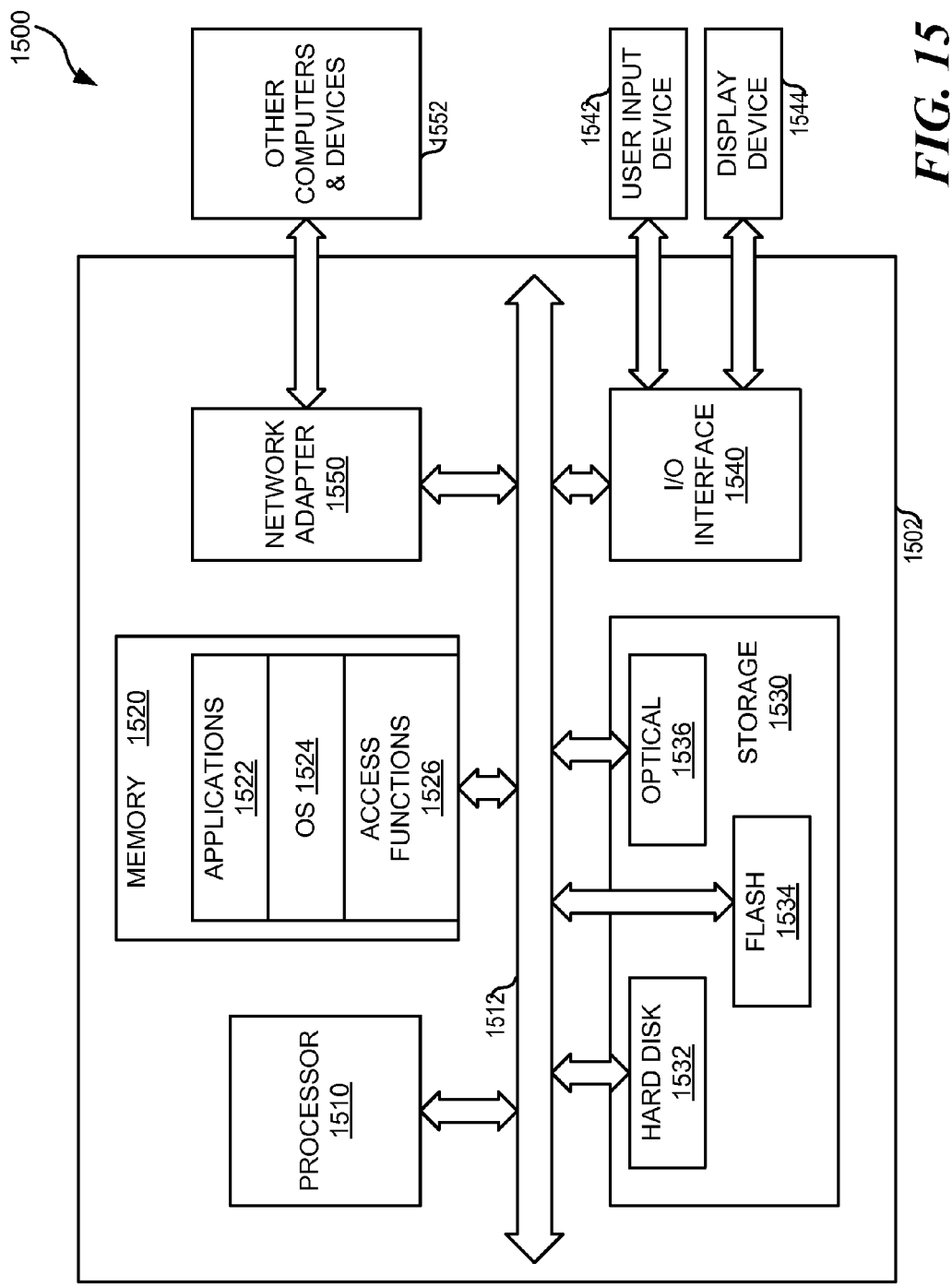

SYSTEM AND METHOD FOR ITERATIVE INTERACTIVE RAY TRACING IN A MULTIPROCESSOR ENVIRONMENT

TECHNICAL FIELD

The present invention relates generally to the field of computer graphics and photorealistic image generation and, more particularly, to a method for improved iterative interactive ray tracing in a multiprocessor environment.

BACKGROUND OF THE INVENTION

Modern computer graphics systems and methods include a variety of techniques designed to render high-quality images for use in a wide variety of applications, including video games, flight and other simulation, motion pictures, and many other applications. For example, for animation studios, ray tracing and global illumination techniques now play an integral role in motion picture production and special effects.

Many techniques focus on tracing the path an imaginary ray of light travels as it moves from a light source though a scene. In "ray casting," for each pixel in a scene, a graphics system traces an imaginary ray from a selected observation point into the scene, to a selected light source, updating pixel color, shading and other factors, based on whether the ray intersects with an object in the scene on its way to the light source. In this way, the graphics system can quickly determine whether an object in a scene is visible to the observation point (visibility), and whether other objects in the scene block light coming from a light source from falling on the object (direct shadows). As such, the graphics system can render a three-dimensional scene into a two-dimensional image suitable for a computer screen, for example. As used herein, "ray casting" means tracing a ray for visibility and direct shadow computations.

In "ray tracing," particularly Whitted-style ray tracing, when a tracing ray intersects an object in a scene, the graphics system generates one or more of three additional types of rays, "secondary rays," whose origin is the intersection point of the tracing ray and the object: reflection rays, refraction rays and shadow rays. "Reflection" rays travel from the intersection point in the direction of the mirror reflection path of the original ray. If a reflected ray intersects with another object, that reflected object affects the pixel representing the intersection point, by showing a mirror image of the reflected object on the first object.

If the original tracing ray intersects a transparent object, "refraction" rays travel from the intersection point in the direction of the refraction path of the original ray, and can travel through the object. If a refraction ray intersects with another object, the graphics system updates the pixel representing the intersection point accordingly. If the object faces a light source, "shadow" rays trace a direct-line path from the intersection point to the light source. If a shadow ray intersects an opaque object, the opaque object blocks the light coming from the light source to the intersection point, and the graphics system updates the pixel representing the intersection point accordingly.

In addition to Whitted-style secondary rays, typical graphics systems can also perform a number of other scene manipulations to enhance the photorealism of the depicted scene. For example, "global illumination" (a general term for techniques that add indirect lighting considerations to a scene) adds additional realism to a scene by improving the realism of scene lighting. Because global illumination techniques are frequently resource-intensive, some typical graphics systems use ambient occlusion to simulate global illumination. Generally, "ambient occlusion" casts multiple rays from primary and secondary intersection points, computing coverage ratios based on the number of sample rays that intersect with other objects and surfaces.

Ambient occlusion and ray tracing's secondary rays add detail not available in ray casting, which results in more photorealistic images. However, the additional rays also require additional computation and storage resources. Such additional computation and storage requirements have often made interactive ray tracing impractical or impossible. But recent advances in software techniques have renewed interest in ray tracing images in interactive time frames.

One common approach is to use hierarchical groups or "packets" of rays, which can be tested against an acceleration structure in order to discard a subset of geometry from consideration, such as, for example, when that subset does not reach the observation point. Generally, an acceleration structure is a data structure used to hold information about scene geometry, which can be used to evaluate whether a particular ray path intersects an object in the scene, among other things. Example acceleration structures include the uniform grid, binary tree, KD tree, octree, and bounded-volume hierarchy. Using hierarchical packets of rays and traversing the packets through an acceleration structure often greatly reduces the required number of operations while maintaining acceptable accuracy.

Modern graphics systems, however, typically focus on traversing packets of primary rays and shadow rays (that is, ray casting rays) through accelerations structures, as rays in primary and shadow ray packets share a common origin and have a high degree of directional coherence. But ray tracing's secondary rays, and ambient occlusion rays, for example, typically do not share a common origin, and do not have a high degree of directional coherence. As such, processing secondary rays, even with acceleration structures, is more complicated and computationally intensive than processing typical primary or shadow rays.

Moreover, typical graphics systems use a recursive solution to process ray tracing and global illumination packets, typically a single ray at a time, which resolves shaded colors for secondary rays before the primary color can be returned. For example, FIG. 2 illustrates an example of recursive Whitted-style ray tracing (this disclosure describes FIG. 1 below). As shown, in recursive Whitted-style ray tracing, a "hit" (intersection with a primary ray and an object in the scene) at one level of the process, causes a call to a function that invokes the process at a lower level to process the secondary rays originating at the intersection. Thus, one skilled in the art will understand that, in the common recursive approach shown, processing the secondary rays delays calculation of the primary ray's hit color until all of the secondary rays have been processed.

This recursion presents problems for multi-core processors such as the Cell™, Broadband Engine™, and certain special processing units, such as graphical processing units (GPUs), for example. Specifically, certain such processors restrict local memory, which limits the space available for stack-based function invocation, making performance-prohibitive the complex recursion required in typical algorithms.

Additionally, even where stack-based operations are unlimited, tracing a single ray does not share the cost of memory access latency across a packet of rays. Nor does single-ray processing benefit from other latency solutions such as pipelining, for example. As such, conventional Whitted-style ray tracing is often many times slower than simple ray casting, to the point where conventional ray tracing techniques cannot practically be performed interactively or otherwise in real-time.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

In one embodiment, a method comprises receiving scene model data including a scene geometry model and a plurality of pixel data describing objects arranged in a scene. The method selects a first pixel data of the plurality of pixel data. The method generates a primary pixel color based on the first pixel data. The method generates a primary ray based on the first pixel data. The method determines whether the primary ray intersects an object in the scene. In the event the primary ray intersects an object in the scene, the method determines a primary hit color. In the event the primary ray intersects an object in the scene, the method generates a primary blend factor for the first pixel data based on the primary ray and primary hit color. In the event the primary ray intersects an object in the scene, the method generates a plurality of secondary rays, each secondary ray including an associated direction vector, wherein each direction vector comprises an octant. The method groups the plurality of secondary rays into a plurality of secondary ray packets based on the octant of each direction vector. The method arranges the secondary ray packets in a queue based on the octant of each direction vector in the secondary ray packet. The method generates a first secondary color and a first secondary blend factor based on the secondary ray packets in the queue. The method generates a pixel color for the pixel data based on the primary pixel color, the primary hit color, the primary blend color, the first secondary color, and the first secondary blend factor. The method generates an image based on the pixel color for the pixel data.

In one embodiment, generating a first secondary color and a first secondary blend factor comprises, for each secondary ray packet in the queue, determining an intermediate color and an intermediate blend factor. The method combines the intermediate color of each secondary ray packet into the first secondary color. The method combines the intermediate blend color of each secondary ray packet into the first secondary blend color.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 2 illustrates a block diagram showing an example of Whitted-style ray tracing in accordance with the Prior Art;

FIG. 3 illustrates a block diagram showing an example of an improved approach to ray tracing in accordance with a preferred embodiment;

FIG. 4 illustrates a block diagram showing an example of an improved approach to ray tracing in accordance with a preferred embodiment;

FIG. 5 illustrates a block diagram showing an example octant chart of an improved approach to ray tracing in accordance with a preferred embodiment;

FIG. 6 illustrates a block diagram showing an example of an improved approach to ray tracing in accordance with a preferred embodiment;

FIG. 7 illustrates a block diagram showing an example data structure layout of an improved approach to ray tracing in accordance with a preferred embodiment;

FIG. 9 illustrates a block diagram showing an example octant chart of an improved approach to ray tracing in accordance with a preferred embodiment;

FIG. 12 illustrates a block diagram showing an example of an improved approach to ray tracing in accordance with a preferred embodiment;

FIG. 15 illustrates a block diagram showing an exemplary computer system, which can be configured to incorporate one or more preferred embodiments.

DETAILED DESCRIPTION

Figure 1:
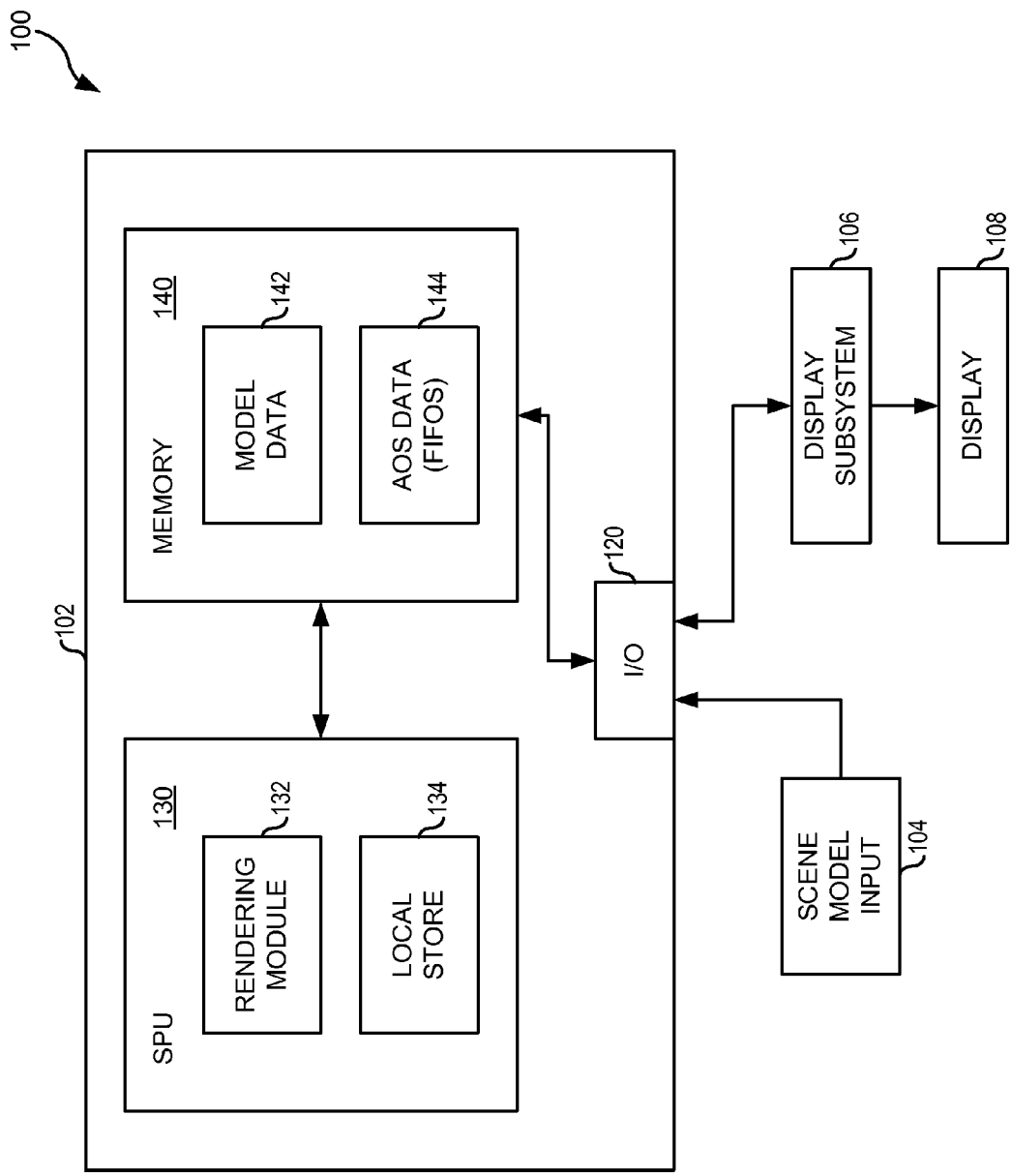
FIG. 1 illustrates a block diagram showing a computer graphics system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved ray tracing, in accordance with a preferred embodiment of the present invention. System 100 comprises a graphics engine 102.

Generally, graphics engine 102 receives and processes scene model input 104, generating a plurality of pixel color data and other information. Graphics engine 102 passes the generated information to a display subsystem 106, which uses the generated information to display an image on a display 108. Typical scene model input 104 includes a plurality of pixel data and a scene geometry model describing an arrangement of objects in a scene. A typical motion picture can include many thousands of still images, each of which is an arrangement of objects in a scene.

Generally, the plurality of "pixel data" correlates the objects in the scene with a reference frame, such as a display screen, placing a finite upper bound on the number of pixels describing the scene from the reference frame. Each pixel used in the scene model input has associated pixel data. In one embodiment, the pixel data includes a coordinate reference for the pixel, indicating the pixel's relative location to other pixels, and a preliminary pixel color, which graphics engine 102 modifies over the course of processing the pixel data, as described below. In an alternate embodiment, the pixel data does not include a preliminary color, and graphics engine 102 adds a pixel color to each of the plurality of pixel data, based on the processing described in detail below.

In the illustrated embodiment, graphics engine 102 includes an input/output (I/O) module 120. Generally, I/O module 120 is an otherwise conventional I/O interface. In operation, I/O module 120 receives scene model input 104. I/O module 120 also couples to a display subsystem 106. Display subsystem 106 is an otherwise conventional display subsystem and is configured to receive processed scene model data from graphics engine 102 and to display an image on display 108 based on the processed scene model data.

In the illustrated embodiment, graphics engine 102 includes a synergistic processing unit (SPU) 130 and memory 140. SPU 130 is an otherwise conventional processing unit (PU), modified as described below. In one embodiment, SPU 130 is a Cell™ processor. In an alternate embodiment, SPU 130 is a Broadband Engine™ processor. Memory 140 is an otherwise conventional memory module 140, modified as described below. Generally, in operation, graphics engine 102 receives unprocessed scene model data 104 and stores the unprocessed scene model data 104 in memory 140. SPU 130 processes the scene model data 104 to generate processed scene model data suitable for display subsystem 106 to use to display an image.

More specifically, memory 140 includes model data 142 and AOS data 144. Model data 142 refers to received scene model data, in various stages of processing. In one embodiment, model data 142 is arranged as a bounding volume hierarchy. AOS data 144 refers to an array of structures (AOS) data structure in a plurality of queues. In one embodiment, AOS data 144 comprises 8×8 packets of primary and shadow rays, in a single instruction multiple data (SIMD) format. In one embodiment, AOS data 144 is arranged as a plurality of first-in-first-out (FIFO) memory blocks. In one embodiment, each FIFO is a dual-port static random access memory (SRAM).

SPU 130 includes rendering module 132 and local store 134. Rendering module 132 is a logic block configured to process scene model data, described in more detail below. Local store 134 is an otherwise conventional PU local store, adapted as described below. Generally, SPU 130 retrieves portions of the model data 142 from memory 140, storing the retrieved portions in local store 134. In one embodiment, the retrieved portions are each of a single pixel data of the plurality of pixel data. As described in more detail below, rendering module 132 processes the retrieved portions of the scene model data, adding a pixel color or modifying an existing pixel color, and returns the modified pixel data to model data 142.

More particularly, graphics engine 102 receives scene model data 104 and performs the novel ray tracing and ambient occlusion techniques described herein. For example, FIG. 3 illustrates a ray tracing technique 300 in accordance with a preferred embodiment. (FIG. 2 illustrates a block diagram showing an example 200 of Whitted-style ray tracing in accordance with the Prior Art.)

One skilled in the art will recall that the typical recursive Whitted-style ray tracing algorithm requires that both the transparency secondary color ($C_T$) and the reflective secondary color ($C_R$) be fully resolved before the primary hit color ($C_{hit}$) can be returned. As described above, this data dependency causes problems for processors with a limited local store.

The illustrated embodiment, however, unrolls the algebraic dependencies of the recursive algorithm so as to support an iterative form. Generally, the embodiments described herein take advantage of a combination of equations that compute transparent and reflective colors, and in so doing, provide a sum of stages that can be computed independently. As described in more detail below, certain embodiments described herein use the sum of stages to defer traversal and shading of secondary rays.

Generally, when a primary ray intersects an object in a scene, the behavior of secondary rays depends in part on whether that object's transparent and reflective characteristics. Regarding the object's transparent characteristics, the color contribution of the object, the transparency secondary color ($C_T$), is a function in part of the shaded color for the intersection point and the objects opacity. That relationship can be described as:

$$C_T = C_{hit} * \text{opacity} + C_{refract} * (1 - \text{opacity}) \quad (1)$$

Where $C_{refract}$ is the shaded color returned by transmuting a secondary ray through the object, in accordance with Snell's law (i.e., refraction).

Regarding the object's reflective characteristics, the color contribution of the object, the reflective secondary color ($C_R$), is a function in part of the shaded color for the intersection point and the object's material index of reflection, here referred to as "fresnel."

$$C_R = C_{hit} * (1 - \text{fresnel}) + C_{reflect} * \text{fresnel} \quad (2)$$

Where $C_{reflect}$ is the shaded color returned by reflecting a secondary ray off the object's surface, in accordance with Snell's law (i.e., reflection).

Certain objects, such as glass, for example, exhibit both reflective and transparent properties. In the illustrated embodiment, the graphics engine resolves the transparent color contribution before the reflective color contribution. In an alternate embodiment, the graphics engine resolves the reflective color contribution before the transparent color contribution. Resolving the transparent color contribution yields the following relationship:

Substituting $C_T$ for $C_{hit}$ in (2):

$$C_R = C_T * (1 - \text{fresnel}) + C_{reflect} * \text{fresnel} \quad (3)$$
$$= (C_{hit} * \text{opacity} + C_{refract} * (1 - \text{opacity})) *$$
$$(1 - \text{fresnel}) + C_{reflect} * \text{fresnel}$$

and $$C_{Final} = C_{hit} * \text{opacity} * (1 - \text{fresnel}) +$$
$$C_{refract} * (1 - \text{opacity}) * (1 - \text{fresnel}) + C_{reflect} * \text{fresnel}$$

In embodiments where the graphics engine resolves the reflective secondary color first, substituting $C_R$ for $C_{hit}$ in (1) results in a different form for $C_{Final}$ in (3).

In embodiments where the graphics engine resolves the transparency secondary color first, $B_{hit}$ is a primary blend factor for scaling $C_{hit}$, $B_T$ is a secondary blend factor for scaling $C_T$, and $B_R$ is a secondary blend factor for scaling $C_R$. Accordingly, $$B_{hit} = \text{opacity} * (1 - \text{fresnel})$$

$$B_T = (1 - \text{opacity}) * (1 - \text{fresnel})$$

$$B_R = \text{fresnel}$$

Thus, by substitution, the graphics engine can generate the final shaded color, the pixel color $C_{Final}$, as a sum of stages that can be computed independently:

$$C_{Final} = C_{hit} * B_{hit} + C_{refract} * B_T + C_{reflect} * B_R \quad (4)$$

Thus, a graphics engine can perform ray tracing 300 in accordance with FIG. 3. For ease of understanding, FIG. 3 illustrates ray tracing 300 in the format of a particular computer program code segment. The illustrated segment can be described using a variety of high- and low-level computer program languages and, as such, the illustrated computer program language is not meant to be limiting.

In the illustrated embodiment, ray tracing 300 includes an initial primary blend factor (blend=1.0) and an initial pixel color ($C_{Final}$=0). In an alternate embodiment, the pixel data received from the scene model data includes an initial primary blend factor and an initial pixel color.

As illustrated, ray tracing 300 determines whether a primary ray intersects an object in the scene (hit=Intersect (scene, ray)), and if not, the pixel color comes from the (blended) scene background ($C_{hit}$=Background(ray)). If the primary ray does intersect an object in the scene, ray tracing 300 iterates through a number of secondary rays, and the pixel color comes from the (blended) effect of the secondary rays (e.g., $C_{hit}$=Shade (ray)), as described in more detail below.

More particularly, ray tracing 300 takes advantage of the algebraic transformation shown in equation (4), deferring tracing and shading secondary rays. Specifically, a graphics engine employing ray tracing 300 can compute $C_{hit}$, $C_{refract}$, and $C_{reflect}$ during different iterations of the ray trace loop, blending them together to produce the final shaded result, the pixel color. When the graphics engine generates new secondary rays, the graphics engine also carries forward the new rays' blend factor, so as to properly scale secondary colors with the previously accumulated results.

As described in more detail below, the illustrated "SecondaryRayGen" operation detects intersections with reflective or transparent surfaces, generates secondary rays per Snell's law, enqueues new rays for later processing, and returns a blend factor for scaling the current shaded result. As described in more detail below, the illustrated "SecondaryComplete" operation determines whether all secondary rays have been expired or processed. As described in more detail below, the illustrated "SecondaryRay" operation dequeues and returns the next ray to be processed, along with its blend factor.

In one embodiment, graphics engine 102 also processes directionally coherent packets of secondary rays. FIG. 4 illustrates a ray tracing technique 400 in accordance with a preferred embodiment. For ease of understanding, FIG. 4 illustrates ray tracing 400 in the format of a particular computer program code segment. The illustrated segment can be described using a variety of high- and low-level computer program languages and, as such, the illustrated computer program language is not meant to be limiting.

As illustrated, in one embodiment, when the graphics engine performing ray tracing 400 detects intersections with reflective or transparent surfaces, the graphics engine generates a plurality of new secondary rays. In one embodiment, the graphics engine generates a fixed number of secondary rays. In an alternate embodiment, the graphics engine generates a number of secondary rays based on the pixel data and scene model data. The graphics engine enqueues the secondary rays into secondary ray FIFOs (AOS data 144), forming packets of secondary rays based on the sign of the secondary ray direction vectors, described in more detail below.

In one embodiment, the graphics engine then computes a shaded result for the current primary intersection, applying the blend factors described in equation (4), and storing the result into an accumulated color buffer (in memory 140). The graphics engine subsequently dequeues the deferred secondary rays from the secondary ray FIFOs, processing the secondary rays as directionally coherent packets, described in more detail below. The graphics engine repeats this process until all outstanding secondary rays for the current intersection have been expired.

As described above, secondary rays differ from primary and shadow rays in that they do not share a common origin. As such, conventional graphics engines do not ordinarily bundle secondary rays, instead processing each secondary ray in a recursive manner described above with respect to FIG. 2. The illustrated embodiment of FIG. 4, however, achieves significant technical advantages in processing secondary rays as packets in the manner described herein. For example, grouping secondary rays into directionally coherent packets amortizes the cost of memory latency across a group of rays. This stabilizes latency penalties for the packet and can result in smoother processing.

Grouping and processing secondary rays as directionally coherent packets also allows the graphic engine to move through the scene geometry using in-order traversal techniques, which simplifies the processing task. This approach also truncates search criteria using ray-interval arithmetic. Additionally, this iterative packet-based approach further allows the graphics engine to unroll the primitive intersection loops to avoid instruction pipeline stalls, which can improve processor performance and throughput.

As described above, the graphics engine "SecondaryRayGen" operation detects intersections with reflective or transparent surfaces, and generates secondary rays per Snell's law. The graphics engine groups these secondary rays into packets based on the octant of their direction vector, described in more detail below, and enqueues the packets for processing. As they are processed the secondary rays return a modified blend factor to be used when shading the current intersection point.

As described above, in one embodiment, the graphics engine generates a predetermined number of secondary rays. In an alternate embodiment, the graphics engine generates a number of secondary rays based on a per-ray bounce count. So configured, secondary rays expire after a predetermined number of steps or "bounces". In one embodiment, the graphics engine determines the number of bounces based on the scene geometry of the scene model data.

As described above, each secondary ray includes a direction vector, which falls into one of eight octants. Each secondary ray direction vector is assigned one of eight possible index values, based on its octant in the Cartesian coordinate system. FIG. 5 illustrates an exemplary mapping 500 of index values to octants in a preferred embodiment. As illustrated, for each Cartesian direction (X, Y, Z), the direction vector component in that direction is oriented in either positive or negative direction, or is zero. In the illustrated embodiment, the graphics engine treats a zero component in a particular direction as a positive orientation. Accordingly, the graphics engine can map every possible combination of direction orientations for a direction vector to an octant and an associated index value.

In one embodiment, the graphics engine determines the octant direction index for a secondary ray's direction vector though a hash function. FIG. 6 illustrates a hash technique 600 in accordance with a preferred embodiment. For ease of understanding, FIG. 6 illustrates hash 600 in the format of a particular computer program code segment. The illustrated segment can be described using a variety of high- and low-level computer program languages and, as such, the illustrated computer program language is not meant to be limiting. In one embodiment, hash 600 is a SIMD hash function.

The graphics engine uses the direction index to configure the secondary rays into an array-of-structures [AoS] format. The graphics engine thereby enqueues each secondary ray by its direction index. This approach also avoids tracing secondary rays that did not hit a reflective or transparent surface. FIG. 7 illustrates an exemplary AoS 700.

As shown, AoS 700 provides a compact representation of relevant secondary ray information. In one embodiment, AoS 700 comprises 16 bytes and stores the secondary ray origin (o.x, o.y, o.z), direction (d.x, d.y, d.z), secondary blend factor (blend), bounce count (bc), and index (idx) into to the accumulated color buffer.

As described above, the graphics engine enqueues the secondary rays into FIFOs based on their direction index. In one embodiment, each FIFO is a circular queue, configured with a head/read pointer and a tail/write pointer. In one embodiment, the graphics engine enqueues each packet of secondary rays in its own FIFO. In one embodiment, the graphics engine selects FIFOs for processing in the order of importance of the secondary rays in the queue. That is, the graphics engine selects and processes those secondary rays with the most important contribution to color before other secondary rays. Thus, the graphics engine improves performance, especially when operating under real-time constraints.

Figure 8:
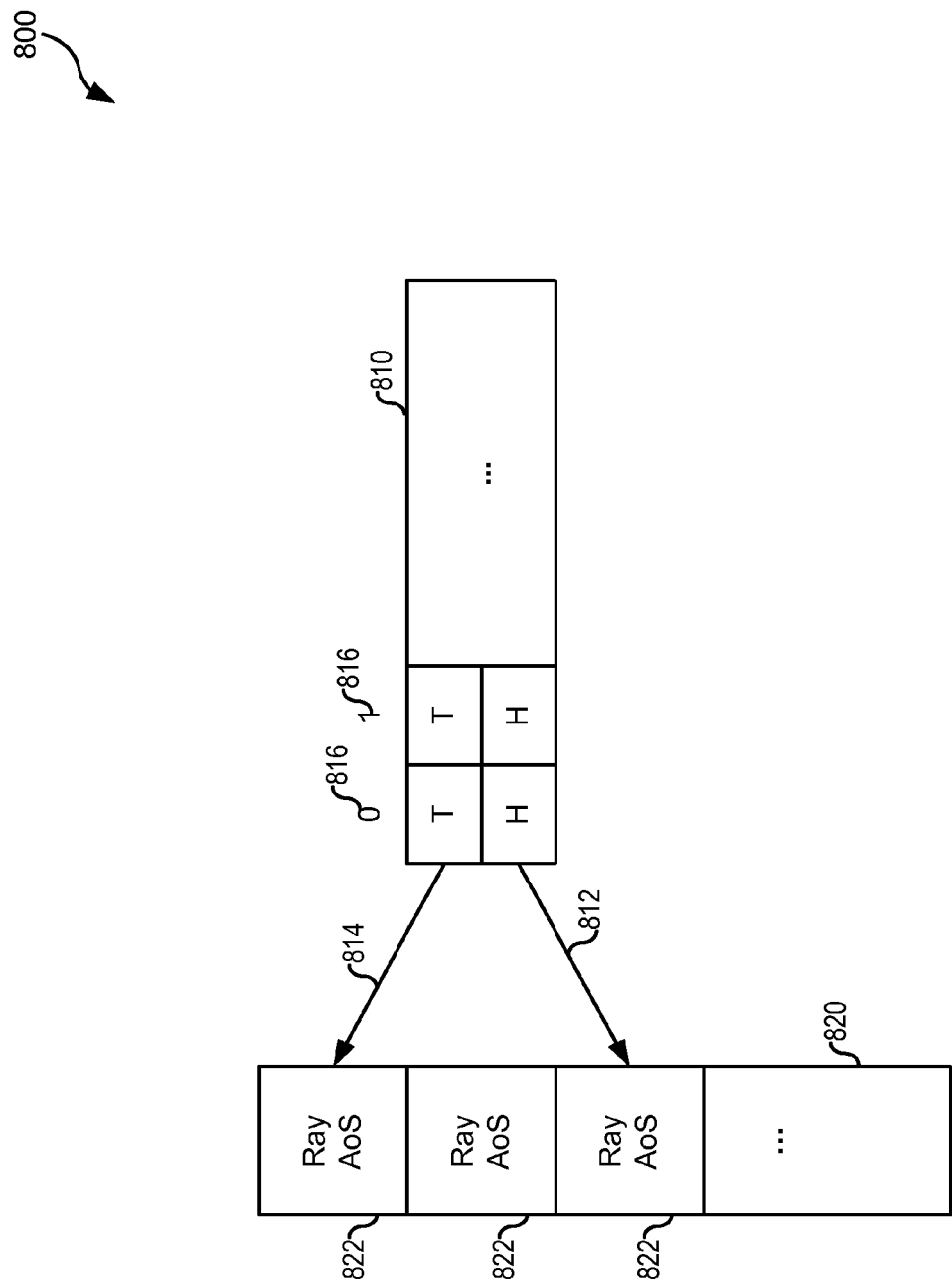
FIG. 8 illustrates a block diagram showing an example data structure layout of an improved approach to ray tracing in accordance with a preferred embodiment.

FIG. 8 illustrates an exemplary configuration of FIFOs. Memory 800 includes an otherwise conventional cache 810. Cache 810 stores pairs of head pointers 812 and tail pointers 814, paired by the directional index 816 of the secondary rays in the associated FIFO. For example, FIFO 820 includes a plurality of secondary ray AoS structures 822, to which point the head pointer 812 and tail pointer 814 of index 816 (0).

In one embodiment, cache 810 is a 4-way set-associative, software-managed cache. In one embodiment, cache 810 is in the range of 1 to 4 kilobytes (kb) in size. Generally, in a preferred embodiment, cache 810 is configured with at least 16 cache lines, with one cache line dedicated to each of the 16 head and tail pointers of the 8 octants.

In one embodiment, the FIFO depth corresponds to the maximum bounce count supported by the graphics engine. In one embodiment, FIFO depth is 1024, which requires at least 128 kb of local memory for each FIFO. In one embodiment, the graphics engine allocates this local memory storage from the effective address space during process initialization. In one embodiment, local memory comprises double data rate (DDR) memory. In an alternate embodiment, local memory comprises the local store of a symmetric processing element (SPE).

Having generated the secondary rays and enqueued the generated rays in the FIFO queues, the graphics engine next processes the secondary rays in packets. In one embodiment, the graphics engine begins to process the secondary rays by identifying a nonempty secondary ray queue. In one embodiment, the graphics engine uses the primary ray (or primary ray packet) direction as the initial queue index, processing secondary rays with that direction index until the queue associated with that direction index is empty.

In one embodiment, the graphics engine selects the next non-empty queue with next highest direction index for processing. In an alternate embodiment, the graphics engine selects the next queue in round-robin fashion. In an alternate embodiment, the graphics engine selects the next queue so as to minimize the sign change in the direction of the component vectors of the direction vector. FIG. 9 illustrates a chart 900 showing an exemplary processing order.

As shown in chart 900, for example, a graphics engine that has processed all of the secondary rays in the queue for direction index "0", next selects the queue for direction index "4". If there are no secondary rays enqueued in the queue for direction index "4", or once all of those secondary rays have been expired, the graphics engine next processes the secondary rays enqueued in the queue for direction index "5" and so forth. In the illustrated embodiment, the queue ordering minimizes the amount of change in the sign bits from the current to the next octant, which improves cache coherency.

In one embodiment, when the graphics engine finds a nonempty secondary ray queue, the graphics engine dequeues up to 64 secondary rays. The graphics engine transposes the dequeued secondary rays from the AoS format into a structure of arrays (SoA) format and bundles the transposed secondary rays into a directionally coherent packet. In one embodiment, the packet structure includes a type flag, set by the graphics engine to indicate whether the packet is a primary, shadow, or secondary ray packet. In one embodiment, the graphics engine selects the appropriate intersection algorithm based on the type flag.

In the event that fewer than 64 secondary rays are available in a given queue, in one embodiment, the graphics engine replicates the last secondary ray dequeued, to round up the number of secondary rays in the packet to an even multiple of 16. Rounding up to even multiples of 16 simplifies looping in the traversal stage, and helps minimize negative caching side effects from having inaccurate ray direction vectors in the packets. More specifically, the primitive intersection loops are configured to iterate against an even multiple of 16 rays, which additionally helps avoid instruction pipeline stalls.

Figure 10:
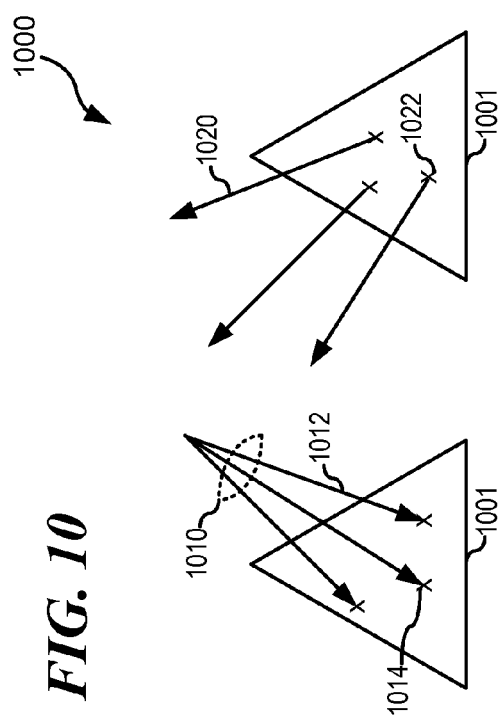

As described above, secondary rays do not share a common origin. As illustrated in the scene 1000 of FIG. 10, a packet 1010 of primary rays 1012, which all share a primary origin point, intersect an object 1001 at different intersection points 1014. Each intersection point generates a secondary reflection ray 1020, with a different origin 1022. Typical bounding volume hierarchies lack a well-defined trivial-reject method against a set of rays with different origins. Accordingly, in one embodiment, packet processing includes ray-interval arithmetic and first-hit entry, which helps avoid traversing scene geometry that does not intersect with at least one of the rays in the packet.

Having dequeued and transposed a packet of secondary rays, the graphics engine processes the secondary rays in the packet in a shading operation (as illustrated, for example, in FIG. 4). In one embodiment, the shading operation iterates against even multiples of four rays at a time. In one embodiment, the graphics engine blends shaded colors into the accumulated color buffer using SIMD multiply-add instructions. In one embodiment, the graphics engine initializes the color buffer to 0's and initializes the blend factors to 1's.

In one embodiment, for primary rays that do not hit a transparent or reflective surface, the shading operation is algebraically equivalent to returning the shaded color for each primary ray. In one embodiment, for reflective or transparent surfaces, the graphics engine multiplies the blend factor $B_{hit}$ by the ray's previous blend factor before accumulating the updated blend factor into the color buffer. Further, in one embodiment, the graphics engine discards any replicated secondary rays (used to bring a ray packet total to 16) by storing the results to a null color buffer location.

Accordingly, as described above in one embodiment, the graphics engine described herein receives incoming scene model data and generates a plurality of primary rays originating from the observation point through the pixel under consideration, and which the graphics engine runs through the scene geometry. Where primary rays intersect an object, the graphics engine generates secondary rays, each of which the graphics engine enqueues in FIFO queues based on the direction index of the secondary ray. The graphics engine dequeues secondary rays in packets in multiples of 16 (up to 64), progressing from queue to queue in a predetermined order based on the octant that queue serves. For each packet, the graphics engine processes rays in bundles of 4, blending secondary colors based on the behavior of the ray under consideration. When the graphics engine completes a packet of primary rays, and that packet's secondary rays, the graphics engine sets (or modifies) the pixel color according to the calculated primary color, primary blend factor, secondary color, and secondary blend factor. Thus, the iterative-oriented graphics engine avoids some of the disadvantages and problems associated with recursive-oriented systems and methods.

The graphics engine can also be configured to improve other aspects of graphic rendering. For example, the graphics engine can be configured to employ antialiasing techniques such as supersampling and multisampling to improve the quality of rendered images by reducing jagged edges. Similarly, the graphics engine can be configured to employ adaptive supersampling or adaptive multisampling.

Figure 11:
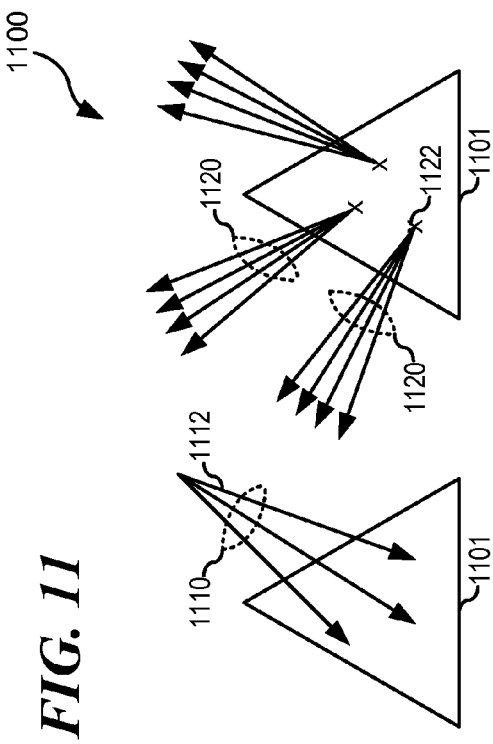
FIG. 10 and FIG. 11 illustrate block diagrams showing example primary and secondary rays in an improved approach to ray tracing in accordance with a preferred embodiment.

Furthermore, as described above, some graphics systems also include ambient occlusion techniques to improve photorealism. Generally, in one embodiment, the graphics engine implements ambient occlusion techniques by casting occlusion sample rays from each primary ray intersection point, and computing a coverage ratio based on the number of sample rays that intersect with other surfaces. As illustrated in the scene 1100 of FIG. 11, a packet 1110 of primary rays 1112 intersects with an object 1101. In an exemplary ambient occlusion technique, the graphics engine generates a packet 1120 of sample secondary rays originating from each primary ray intersection 1122.

Thus, in one embodiment, ambient occlusion casts multiple random reflection rays for each primary and secondary hit point, and therefore typical ambient occlusion techniques are usually a heavy computational workload. Conventional graphics techniques cast, for example, four ambient occlusion samples per hit point, gathering the samples into packets that are not directionally coherent. Maintaining the ambient occlusion packets' state on the stack would therefore require 28 kb of additional storage. This additional storage occupies limited stack space, and in some cases, caps the ambient sampling rate. By contrast, movie-quality productions may use 64 or more ambient occlusion samples per hit point.

But the graphics engine described herein can be configured to generate an arbitrary number of ambient occlusion samples, efficiently marching these sample rays using the directionally coherent secondary ray packet techniques described above. For example, in one embodiment, the AoS FIFOs include a separate set of ambient occlusion ray FIFOs, which are processed using directionally coherent packets in a manner similar to secondary rays.

For example, FIG. 12 illustrates an ambient occlusion technique 1200 in accordance with a preferred embodiment. For ease of understanding, FIG. 12 illustrates ambient occlusion technique 1200 in the format of a particular computer program code segment. The illustrated segment can be described using a variety of high- and low-level computer program languages and, as such, the illustrated computer program language is not meant to be limiting.

As illustrated, the AmbientRayGen operation generates a packet of ambient occlusion sample rays. The ProcessAmbient operation detects intersections with occluding surfaces and increments coverage values for each of the original hit points. The graphics engine passes the coverage values to the Shade operation, which uses the coverage values as an ambient scale factor in the lighting equation. In one embodiment, the graphics engine uses the Phong lighting equation.

As such, the graphics engine disclosed herein can also be configured to process ambient occlusion sample rays. Accordingly, the graphics engine disclosed herein can also improve performance of secondary photorealism rays and techniques such as ambient occlusion, global illumination, reflection, refraction, motion-blur, depth-of-field, shadow rays, and other rendering rays and techniques. The graphics engine can be configured to enqueue one or all of these secondary photorealism rays using the techniques disclosed herein, to provide additional processing improvement.

Figure 13:
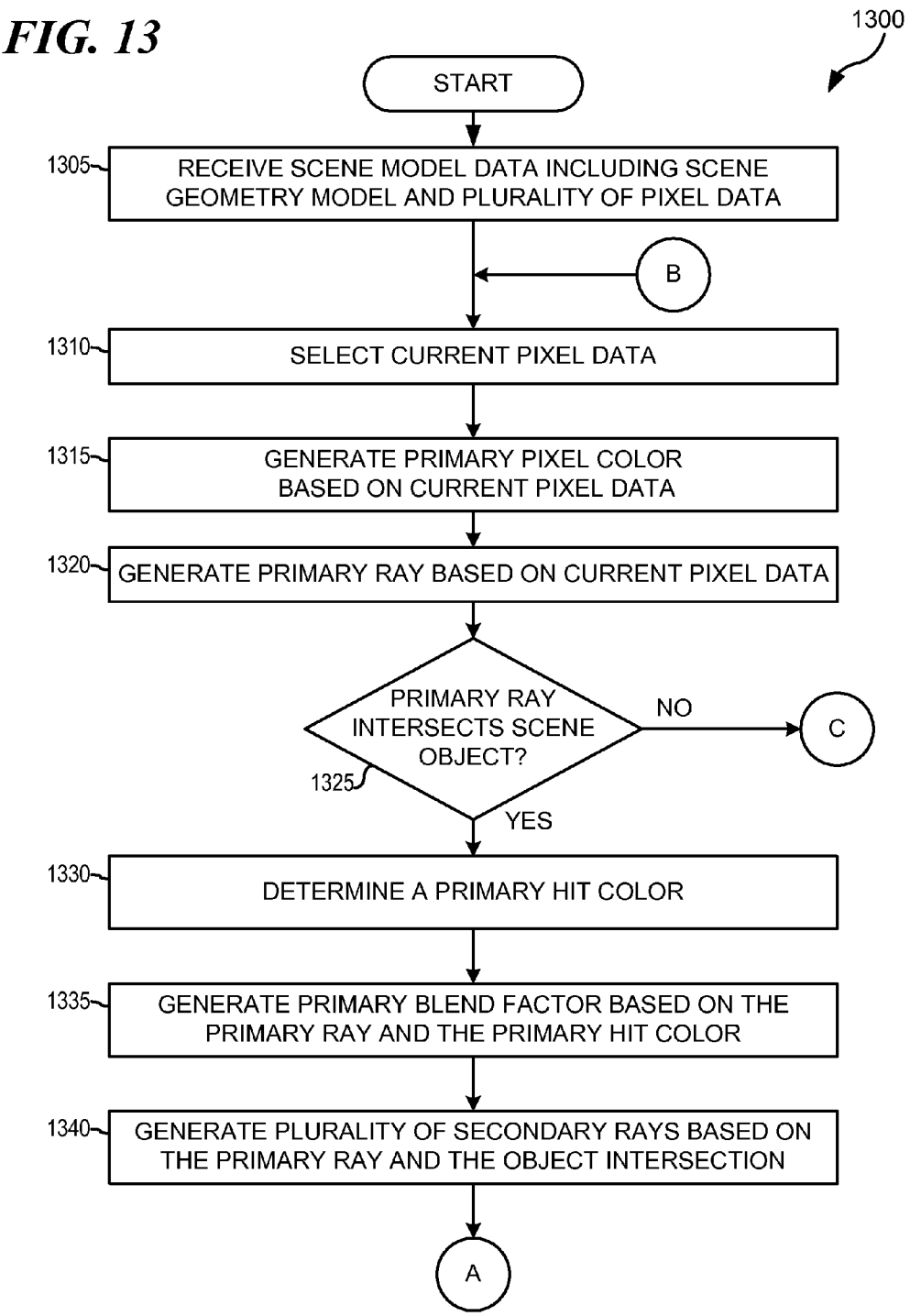
FIG. 13 illustrates a high-level flow diagram depicting logical operational steps of an improved ray tracing method, which can be implemented in accordance with a preferred embodiment.
Figure 14:
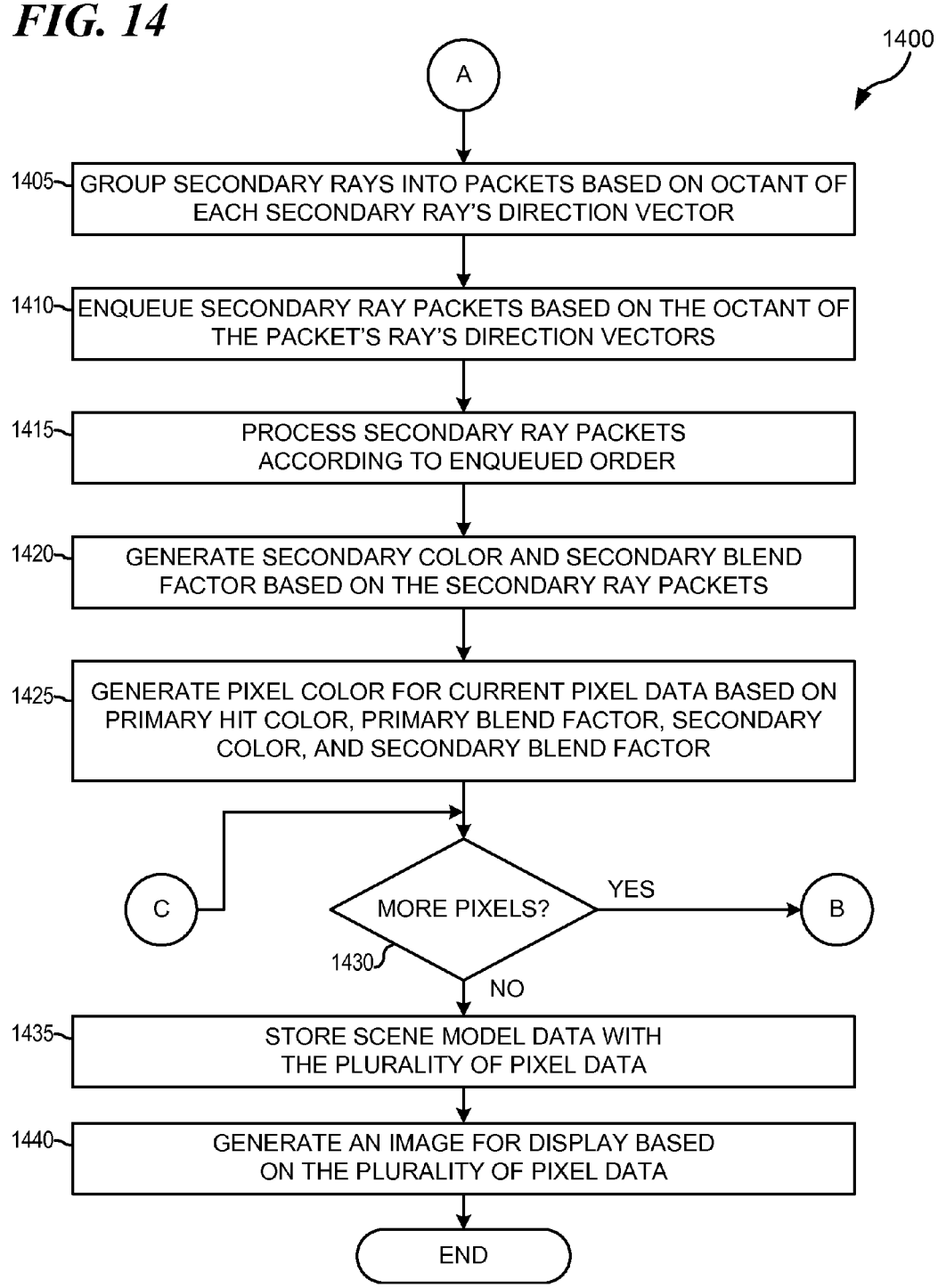
FIG. 14 illustrates a high-level flow diagram depicting logical operational steps of an improved ray tracing method, which can be implemented in accordance with a preferred embodiment.

Accordingly, as described above, the graphics engine can be configured to apply the disclosed directionally coherent packet techniques to improve ambient occlusion rendering, particularly in systems with limited local storage. FIGS. 13 and 14 describe the operations of the graphics engine in one embodiment, in additional detail.

FIG. 13 illustrates one embodiment of a method for iterative ray tracing. Specifically, FIG. 13 illustrates a high-level flow chart 1300 that depicts logical operational steps performed by, for example, system 100 of FIG. 1, which may be implemented in accordance with a preferred embodiment. Generally, a graphics engine, such as graphics engine 102 of FIG. 1, performs the steps of the method, unless indicated otherwise.

As indicated at block 1305, the process begins, wherein the graphics engine receives scene model data, which includes a scene geometry model and a plurality of pixel data. In one embodiment, one or more of the plurality of pixel data includes a preliminary pixel color. Next, as indicated at block 1310, the graphics engine selects one of the plurality of pixel data as the current pixel data.

Next, as indicated at block 1315, the graphics engine generates a primary pixel color based on the current pixel data. In one embodiment, the graphics engine generates the primary pixel color based on the preliminary pixel color. Next, as indicated at block 1320, the graphics engine generates a primary ray based on the current pixel data. For clarity of explanation, in the illustrated embodiment, the graphics engine generates one primary ray per pixel. In an alternate embodiment, the graphics engine generates a plurality of primary rays per pixel, following one or more of the steps described below for each primary ray.

Next, as indicated at decisional block 1325, the graphics engine determines whether the primary ray intersects an object in the scene based on the scene geometry model. If at block 1325 the primary ray intersects an object in the scene, the process continues along the YES branch to block 1330.

Next, as indicated at block 1330, the graphics engine determines a primary hit color based on the intersection of the primary ray and the object. Next, as indicated at block 1335, the graphics engine generates a primary blend color based on the primary ray and the primary hit color.

Next, as indicated at block 1340, the graphics engine generates a plurality of secondary rays based on the intersection of the primary ray and the object. The process continues to marker "A" of FIG. 14.

FIG. 14 illustrates one embodiment of a method for iterative ray tracing. Specifically, FIG. 14 illustrates a high-level flow chart 1400 that depicts logical operational steps performed by, for example, system 100 of FIG. 1, which may be implemented in accordance with a preferred embodiment. Generally, a graphics engine, such as graphics engine 102 of FIG. 1, performs the steps of the method, unless indicated otherwise.

From marker "A", the process continues to block 1405. As indicated at block 1405, the graphics engine groups secondary rays into packets based on the secondary ray's direction vector octant. Next, as indicated at block 1410, the graphics engine enqueues each ray in the secondary ray packet in a queue based on the ray's direction vector octant. Next, as indicated at block 1415, the graphics engine processes packets of secondary rays according to the enqueued order of each ray in the packet.

In the illustrated embodiment, the graphics engine groups secondary rays into packets based on the secondary ray's direction vector octant (1405) and then enqueues the secondary rays as packets (1410). In an alternate embodiment, the graphics engine enqueues the secondary rays based on the secondary ray's direction vector octant (1410) and then dequeues the secondary rays as packets (1405) based on their order in the queue, for processing (1415).

Next, as indicated at block 1420, the graphics engine generates a secondary color and secondary blend factor based on the processed secondary ray packets. Next, as indicated at block 1425, the graphics engine generates (and stores) a pixel color for the current pixel data based on the primary hit color, the primary blend factor, the secondary color, and the secondary blend factor.

Next, as indicated at decisional block 1430, the graphics engine determines whether there are additional pixels and/or pixel data to process. If at decisional block 1430 there are additional pixels to process, the process continues along the YES branch to marker "B", returning to block 1310 of FIG. 13, wherein the graphics engine selects the next pixel data as the current pixel data, and the process continues as described above.

If at block 1325 the primary ray does not intersect an object in the scene, the process continues along the NO branch to marker "C", wherein the process continues to decisional block 1430 as described above. Next, as indicated at block 1435, the graphics engine stores the scene model data with the plurality of pixel data. Next, as indicated at block 1440, a display subsystem generates an image for display based on the plurality of pixel data.

Accordingly, the disclosed embodiments provide numerous advantages over other methods and systems. For example, the graphics engine described herein can provide improved ray tracing performance, even in systems with limited local storage. The disclosed embodiments also improve ambient occlusion performance that is scalable to fit the requirements of the desired photorealism quality and particular system used to embody the graphics engine.

As described above, one or more embodiments described herein may be practiced or otherwise embodied in a computer system. Generally, the term "computer," as used herein, refers to any automated computing machinery. The term "computer" therefore includes not only general purpose computers such as laptops, personal computers, minicomputers, and mainframes, but also devices such as personal digital assistants (PDAs), network enabled handheld devices, internet or network enabled mobile telephones, and other suitable devices. FIG. 15 is a block diagram providing details illustrating an exemplary computer system employable to practice one or more of the embodiments described herein.

Specifically, FIG. 15 illustrates a computer system 1500. Computer system 1500 includes computer 1502. Computer 1502 is an otherwise conventional computer and includes at least one processor 1510. Processor 1510 is an otherwise conventional computer processor and can comprise a single-core, dual-core, central processing unit (PU), synergistic PU, attached PU, or other suitable processors.

Processor 1510 couples to system bus 1512. Bus 1512 is an otherwise conventional system bus. As illustrated, the various components of computer 1502 couple to bus 1512. For example, computer 1502 also includes memory 1520, which couples to processor 1510 through bus 1512. Memory 1520 is an otherwise conventional computer main memory, and can comprise, for example, random access memory (RAM). Generally, memory 1520 stores applications 1522, an operating system 1524, and access functions 1526.

Generally, applications 1522 are otherwise conventional software program applications, and can comprise any number of typical programs, as well as computer programs incorporating one or more embodiments of the present invention. Operating system 1524 is an otherwise conventional operating system, and can include, for example, Unix, AIX, Linux, Microsoft Windows™, MacOS™, and other suitable operating systems. Access functions 1526 are otherwise conventional access functions, including networking functions, and can be include in operating system 1524.

Computer 1502 also includes storage 1530. Generally, storage 1530 is an otherwise conventional device and/or devices for storing data. As illustrated, storage 1530 can comprise a hard disk 1532, flash or other volatile memory 1534, and/or optical storage devices 1536. One skilled in the art will understand that other storage media can also be employed.

An I/O interface 1540 also couples to bus 1512. I/O interface 1540 is an otherwise conventional interface. As illustrated, I/O interface 1540 couples to devices external to computer 1502. In particular, I/O interface 1540 couples to user input device 1542 and display device 1544. Input device 1542 is an otherwise conventional input device and can include, for example, mice, keyboards, numeric keypads, touch sensitive screens, microphones, webcams, and other suitable input devices. Display device 1544 is an otherwise conventional display device and can include, for example, monitors, LCD displays, GUI screens, text screens, touch sensitive screens, Braille displays, and other suitable display devices.

A network adapter 1550 also couples to bus 1512. Network adapter 1550 is an otherwise conventional network adapter, and can comprise, for example, a wireless, Ethernet, LAN, WAN, or other suitable adapter. As illustrated, network adapter 1550 can couple computer 1502 to other computers and devices 1552. Other computers and devices 1552 are otherwise conventional computers and devices typically employed in a networking environment. One skilled in the art will understand that there are many other networking configurations suitable for computer 1502 and computer system 1500.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method, comprising:
receiving scene model data including a scene geometry model and a plurality of pixel data describing objects arranged in a scene;
selecting a first pixel data of the plurality of pixel data;
generating a primary ray based on the first pixel data;
determining whether the primary ray intersects an object in the scene;
in the event the primary ray intersects an object in the scene, determining a primary hit color;
generating a primary blend factor for the first pixel data based on the primary ray and primary hit color;
in the event the primary ray intersects an object in the scene, generating a plurality of secondary rays, each secondary ray including an associated direction vector, wherein each direction vector comprises an octant;
grouping the plurality of secondary rays into a plurality of secondary ray packets based on the octant of each direction vector;
arranging the secondary ray packets in a queue based on the octant of each direction vector in the secondary ray packet;
generating a first secondary color and a first secondary blend factor based on the secondary ray packets in the queue;
generating a pixel color for the pixel data based on the primary hit color, the primary blend color, the first secondary color, and the first secondary blend factor; and
generating, by a hardware device, an image based on the pixel color for the pixel data.

2. The method of claim 1, wherein generating a first secondary color and a first secondary blend factor comprises:
for each secondary ray packet in the queue, determining an intermediate color and an intermediate blend factor;
combining the intermediate color of each secondary ray packet into the first secondary color; and
combining the intermediate blend color of each secondary ray packet into the first secondary blend color.

3. The method of claim 1, wherein the first secondary color comprises a refraction color and the secondary blend factor comprises a refraction blend color.

4. The method of claim 1, wherein the first secondary color comprises a reflection color and the secondary blend factor comprises a reflection blend color.

5. The method of claim 1, wherein the secondary rays comprise ambient occlusion rays, the first secondary color comprises an ambient occlusion color, and the secondary blend factor comprises an ambient occlusion blend color.

6. The method of claim 1, further comprising generating a second secondary color.

7. The method of claim 1, further comprising, in the event the primary ray intersects an object in the scene, generating a primary pixel color before generating the first secondary color.

8. The method of claim 1, further comprising, in the event the primary ray intersects an object in the scene, generating the primary hit color before generating the first secondary color.

9. The method of claim 1, further comprising determining the pixel color based on one of motion-blur, depth-of-field, global illumination, radiosity, photon mapping, and diffuse interreflection.

10. The method of claim 1, further comprising determining the pixel color based on one of supersampling, multisampling, adaptive supersampling, and adaptive multisampling.

11. A method, comprising:
reformulating a set of algebraic dependencies in a recursive Whitted-style ray tracing algorithm;
generating an iterative solution for Whitted-style ray tracing based on the reformulated algebraic dependencies;
receiving scene data comprising a plurality of pixel data and describing a scene; generating a primary ray based on the plurality of pixel data;
generating, subsequent to the primary ray, a plurality of directionally coherent secondary rays based on the iterative solution and whether the primary ray intersects an object in the scene, each secondary ray including an associated direction vector, wherein each direction vector comprises an octant;
grouping the plurality of secondary rays into a plurality of secondary ray packets based on the octant of each direction vector;
arranging the secondary ray packets in a queue based on the octant of each direction vector in the secondary ray packet;
generating a first secondary color and a first secondary blend factor based on the secondary ray packets in the queue;
generating a pixel color for the pixel data based on the primary ray and the first secondary color and the first secondary blend factor based on the secondary ray packets in the queue of the plurality of directionally coherent secondary rays; and
generating, by a hardware device, an image based on the pixel color for the pixel data.

12. A computer-implemented method comprising:
receiving scene model data including a scene geometry model and a plurality of pixel data describing objects arranged in a scene;
selecting a first pixel data of the plurality of pixel data;
generating a primary pixel color based on the first pixel data;
generating a primary ray based on the first pixel data;
determining whether the primary ray intersects an object in the scene;
in the event the primary ray intersects an object in the scene, determining a primary hit color;
generating a primary blend factor for the first pixel data based on the primary ray and primary hit color;
in the event the primary ray intersects an object in the scene, generating a plurality of secondary rays, each secondary ray including an associated direction vector, wherein each direction vector comprises an octant;
grouping the plurality of secondary rays into a plurality of secondary ray packets based on the octant of each direction vector;
arranging the secondary ray packets in a queue based on the octant of each direction vector in the secondary ray packet;
generating a first secondary color and a first secondary blend factor based on the secondary ray packets in the queue;
generating a pixel color for the pixel data based on the primary pixel color, the primary hit color, the primary blend color, the first secondary color, and the first secondary blend factor; and
generating, by a hardware device, an image based on the pixel color for the pixel data.

13. The method of claim 11, wherein generating a first secondary color and a first secondary blend factor comprises:
for each secondary ray packet in the queue, determining an intermediate color and an intermediate blend factor;
combining the intermediate color of each secondary ray packet into the first secondary color; and
combining the intermediate blend color of each secondary ray packet into the first secondary blend color.

14. The method of claim 11, wherein the secondary rays comprise ambient occlusion rays, the first secondary color comprises an ambient occlusion color, and the secondary blend factor comprises an ambient occlusion blend color.

15. The method of claim 11, further comprising, in the event the primary ray intersects an object in the scene, generating the primary pixel color before generating the first secondary color.

16. The method of claim 11, further comprising, in the event the primary ray intersects an object in the scene, generating the primary hit color before generating the first secondary color.

* * * * *